United States Patent [19]

Corominas

[11] Patent Number: 4,690,046
[45] Date of Patent: Sep. 1, 1987

[54] INJECTING MACHINE FOR MEAT PIECES
[75] Inventor: Narciso L. Corominas, Gerona, Spain
[73] Assignee: Metalquimia, S.A., Gerona, Spain
[21] Appl. No.: 690,596
[22] Filed: Jan. 11, 1985
[30] Foreign Application Priority Data
May 7, 1984 [ES] Spain ..................... 532.269
[51] Int. Cl.⁴ ............................ A23L 3/34; A23B 4/00
[52] U.S. Cl. ..................................... 99/533; 99/535
[58] Field of Search ............... 99/516, 532, 533, 535, 99/576; 426/281

[56] References Cited

U.S. PATENT DOCUMENTS

| | | | |
|---|---|---|---|
| 4,152,000 | 2/1979 | Townsend | 99/533 X |
| 4,220,669 | 9/1980 | Townsend | 99/533 X |
| 4,286,510 | 9/1981 | Prosenbauer | 99/533 X |
| 4,437,397 | 3/1984 | Kawai | 99/533 |

FOREIGN PATENT DOCUMENTS 2127274 4/1984 United Kingdom ............... 99/532

Primary Examiner—Timothy F. Simone
Attorney, Agent, or Firm—Holman & Stern

[57] ABSTRACT

An improved fluid injection (brine, phosphates, etc.) system for meat pieces which obviates the formation of foam by preventing air from entering the injection needles by two means: First, each multi-orificed needle is constrained to pass through an aligned duct or channel in a meat pressing block wherein is formed a discrete fluid chamber at the upper section of the duct and a close-tolerance needle guide in the bottom section. The fluid chamber is always filled with the substance to be injected, but when any of the needle's orifices are exposed to this chamber under pressure (i.e., not fully penetrated into the meat piece) the fluid chamber overflows the pressing block which triggers the shutdown of the fluid pump or pressurizer. Secondly, an "inverted-V" pipe is fixed to the movable injection head assembly so as to feed fluid to all needles through a common manifold either under pressure or through gravity-assisted drainage (between injection phases), thus always ensuring a positive flow of pure liquid through each needle. Additionally, a dual-plate sliding mechanism is provided to facilitate locking in or removing needles from the head assembly. A meat-gripping conveyor also cooperates with the injection head.

5 Claims, 9 Drawing Figures

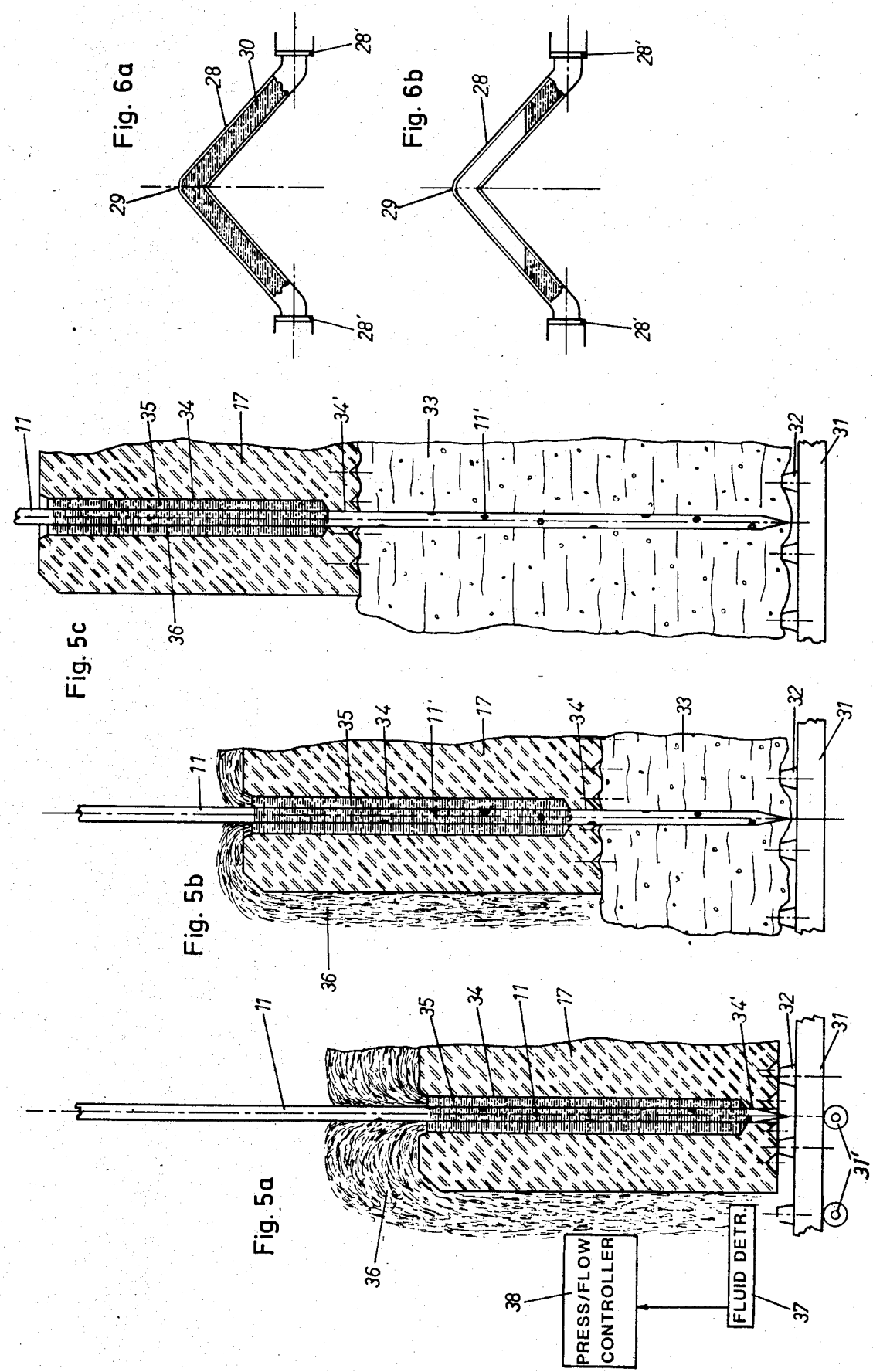

INJECTING MACHINE FOR MEAT PIECES

BACKGROUND OF THE INVENTION

This invention refers to an improved apparatus for product-injection into meat pieces. These machines, according to an already known technique, are made up of one or two heads carrying a number of injecting needles and having a periodic, alternative up-and-down movement on a conveyor on which the meat is placed so that the needles stick into it, whereby brine is injected into the meat mass. The injected substance, such as brine, proteins, phosphate or other product, appropriately dissolved, helps in the preservation and/or improvement of the taste and contexture conditions of the treated piece; it is usually supplied at a rated pressure of 5-8 kg/cm$^2$, which is kept constant even if the flow rate or the percentage of injected substance changes. The injecting needles used are very long, each having defined along its bore and on different sides of its section several orifices of very small diameter. Given such pressure conditions and the small orifices of the injecting needles, a virtual pulverization in the meat area immediate to these needles is caused during the injection phase.

In the Spanish Pat. No. 469,071 granted to the same entity, a description can be found of an injection system which allows one to keep constant the injecting pressure and change the injecting flow rate (speed). Forming a part of the state of the art in this industry is the use of a series of independent pressing blocks, attached to the head by resilient means, through which the injecting needles pass, and which press the meat piece preventing its displacement from the transport plane by adapting themselves to the form of that piece more accurately than a single fixed pressing plate. (Lack of correspondence to the piece outline places different pressures on the different areas of the meat piece, making it difficult to inject liquid thereinto.)

SUMMARY OF THE INVENTION

A main objective of this invention is to make compatible the injection of brine or other substances, at a pressure about 8 kg/cm$^2$ and through the above-mentioned injection needles, with a process whereby no form mass is produced at any time. (This secondary phenomenon is undesirable since it would make difficult the operation of the substance recycling system blocking it at the end, and making inaccurate the injection metering.)

Also shown by this invention a particularly efficient assembly of the injecting needles into the head which consists of up to four parallel rows of needles on a single head and which simplifies the replacing, extracting or reinstatement of these needles while also improving their positioning conditions. The meat piece "sees" a number of quincunxlike needle arrays. It is also a part of this invention to provide adequate means to prevent the entering of air into the injection circuit, especially in the injecting needles. Finally, as can be seen in the text that follows, this invention includes an improvement of the conveyor used to move progressively the meat pieces under the injecting heads.

In accordance with the above and with the aim of preventing foaming of the injected material, which phenomenon gets worse in the cases in which the machine is operating in an intermittent way or with no meat pieces in the injection area during some time periods (labor resting shutdowns, shift changeovers, etc.), it is proposed through this invention a special constitutive structure of the meat-piece pressing blocks through which the injecting needles are placed. In these pressing blocks, a series of vertical ducts, or channels, are arranged. They are cylindric in shape and have at their bottoms an orifice of small diameter which allows the passage of the needles with a close tolerance. The orifice contributes to the needle guiding, being that the diameter of those ducts largely exceeds that of the needle. The hollow, or free room, defined between the needle section and the duct internal wall tends to be at any moment filled with the injected fluid that does not reach the meat piece because of the whole needle not being fully inserted in that meat piece or because of injection that takes place with no meat piece on the conveyor. These annular chambers defined in the pressing blocks, which are continuously filled with the injected substance, prevent the impact of the injected product against the nearest wall, being reduced in speed and pressure when the fluid substance overflows the top of each block falling on the conveyor floor.

BRIEF DESCRIPTION OF THE DRAWINGS

The indicated improvement and the other ones to which this patent of invention relates will be hereinafter detailed with reference to several drawing sheets attached to this specification, on which the following are shown:

FIGS. 5a, 5b and 5c display the operation of this invention with and without a meat piece. FIG. 5c shows how, in the case of the needle being fully stuck into the meat piece, the injecting fluid does not overflow the pressing block and how the annular cavity surrounding the needle remains full of fluid; and FIGS. 6a and 6b schematically show the gravitational principle of the system used to prevent the air entering into the injection circuit during the period between two successive injection phases.

DETAILED DESCRIPTION OF THE DRAWINGS

Figure 1:
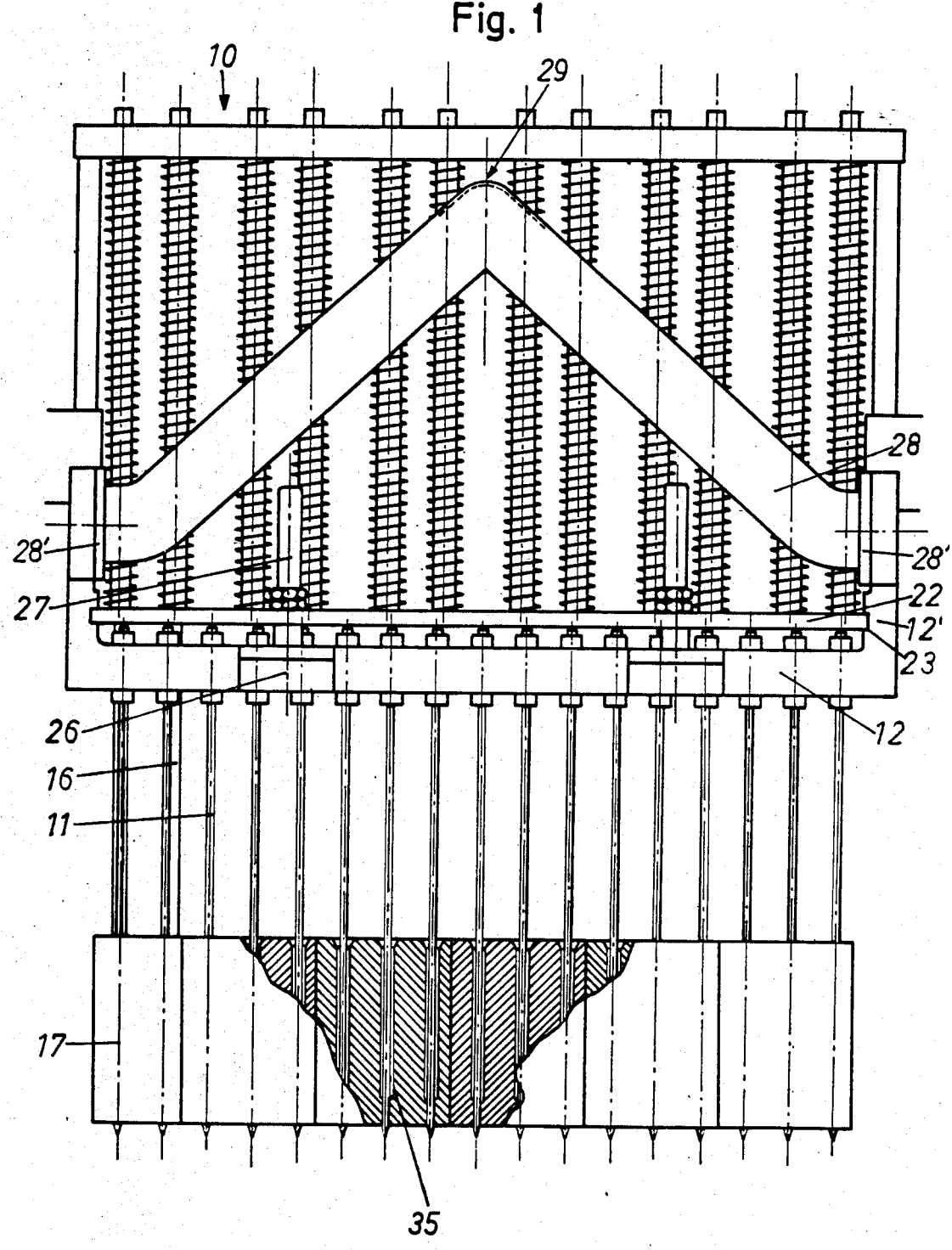
FIG. 1 shows the front side view of the head assembly carrying one row of injecting needles.

According to FIG. 1, the improvements are concretely expressed by a head 10, carrying a number of injecting needles 11, which are mounted on a horizontal base plate 12 which has a series of ducts (14 and 15) passing therethrough to accommodate those needles as well as a number of vertical guide bars 16 which serve to register the pressing blocks 17.

Above the aforementioned base plate 12 there are a couple of parallel plates 22 like handrails, mounted in a sliding condition on a horizontal plane, with respect to the guide profiles 23 which are placed at both ends of the base plate 12 and defined in the lateral portion of its two vertical walls 12'.

Figure 3:
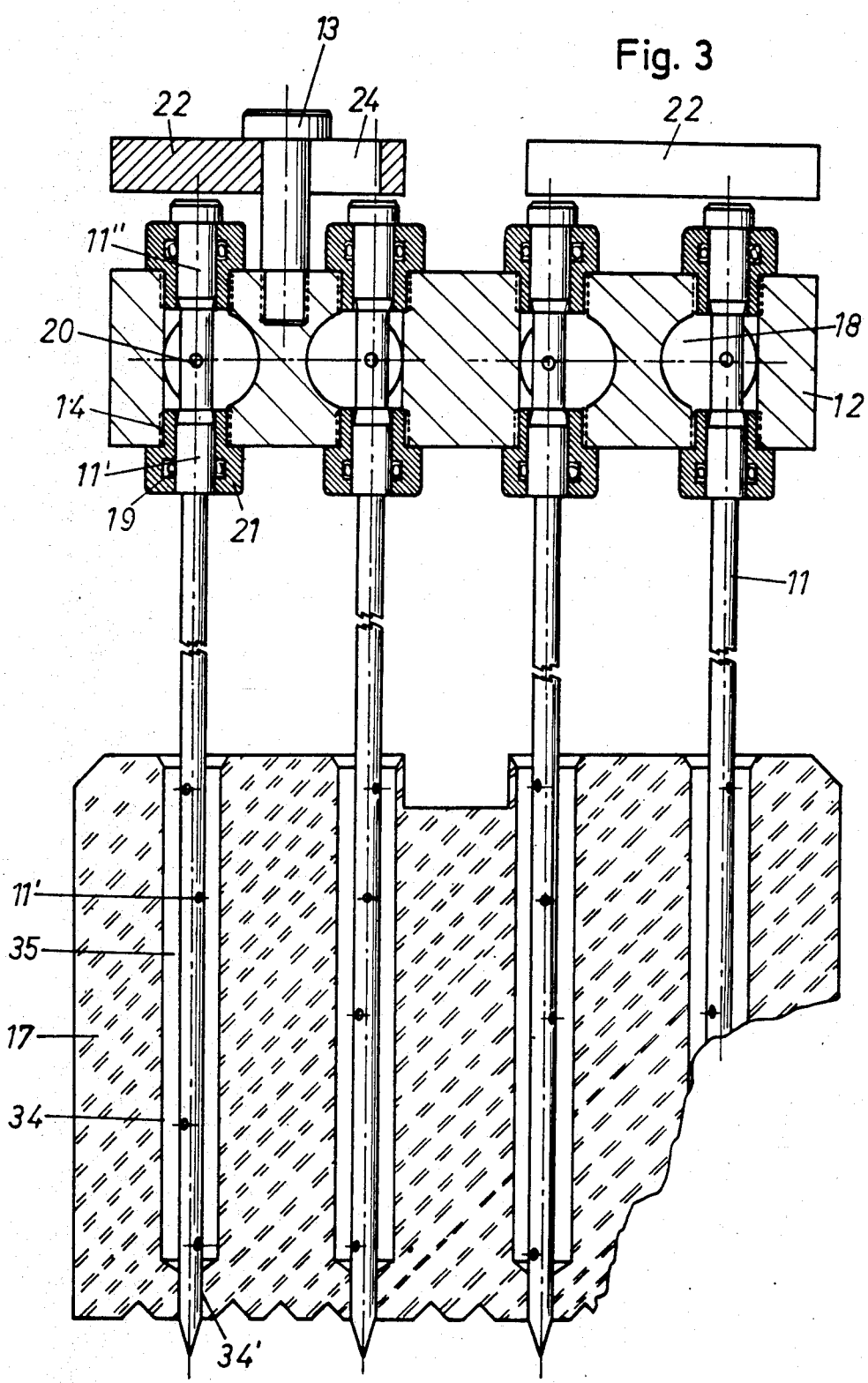
FIG. 3 shows a side cross-section, at a larger scale, of one group of injecting needles, the securing means for them, and one pressing block.

Now, with reference both to FIGS. 1, 3, 5, and 6, the head 10 is shown having a pipe 28 in the form of an "inverted V" connected at its two ends, by means of the appropriate gaskets 28' to the chambers of the injection manifold 18 found inside the base plate 12 (see FIG. 3). This injection pipe 28 is fed pressurized brine or other solution through a small diameter orifice 29 in its top. In operation, the internal chamber 30, which tends to be filled up during the phase of injection under pressure and which during the cycle period when the head raises and the injection is interupted, provides a flow which slowly drains through needles 11, thus ensuring that when the next injection phase takes place air has not entered the needles 11, which would make the injection difficult.

Figure 2:
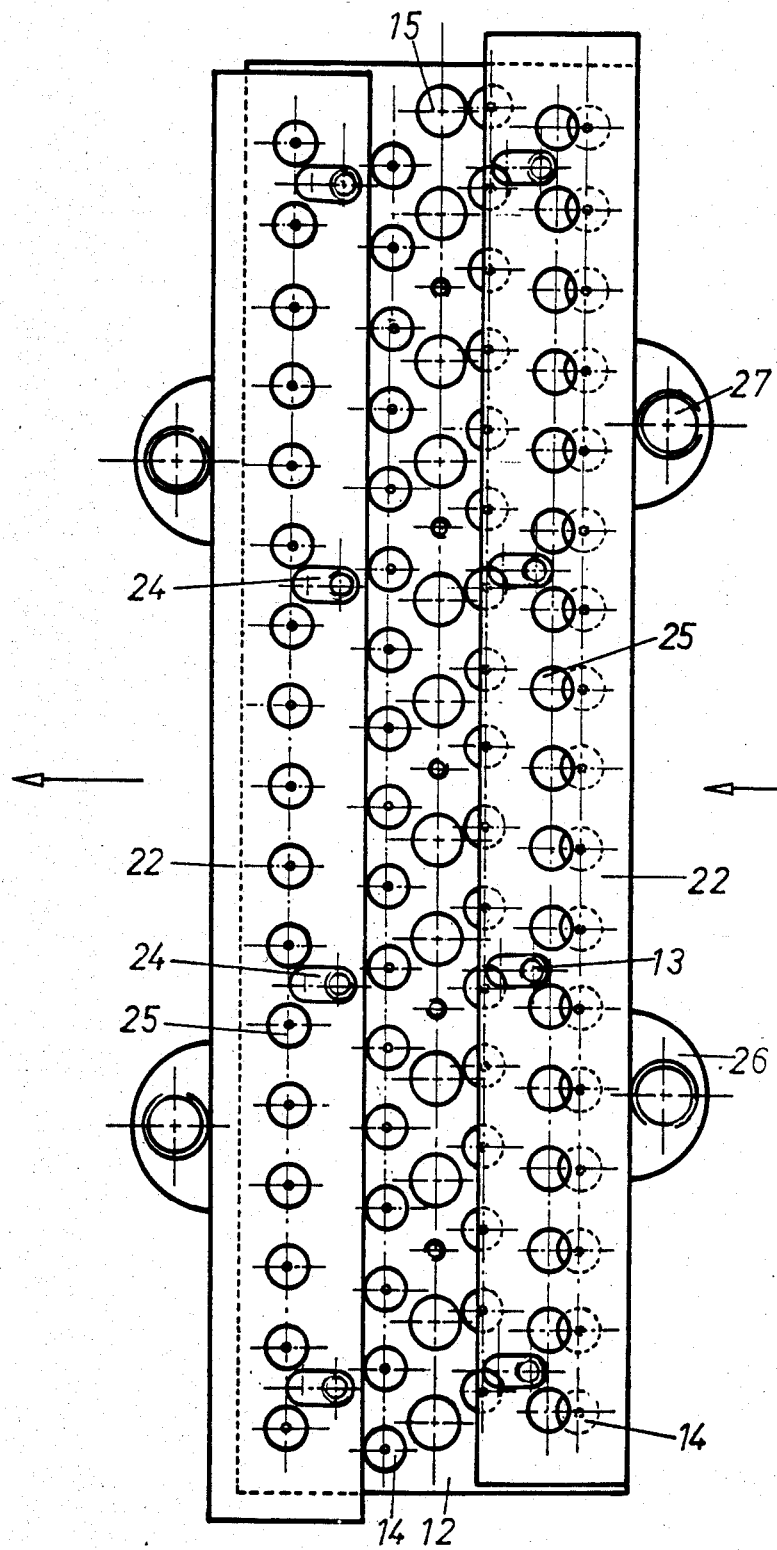
FIG. 2 illustrates the bottom view of the injecting needles' base plate, as well as the mobile plates.

In FIG. 2, it is apparent that the horizontal base plate 12 is arranged with a series of ducts 14 and 15. The central row 15 amounts to a set of blind holes through which pass the vertical guide bars 16. However, the four parallel rows of ducts 14 are aligned with the individual needles 11, and these rows are mutually offset so as to form a kind of quincunx arrangement of the ducts 14 and injection needles 11.

With further reference to FIG. 2, it is evident that each one of the mobile plates 22 has a number of slot holes 24 through which the vertical stems 13 of the base plate 12 may pass; there is also provided in each of the plates 22 a centralized row of through-holes 25 in such a way that these holes 25 may coaxially coincide with the outer row of ducts 14 of the base plate 12 depending upon the lateral position of the mobile plates 22 with respect to the fixed stems 13. In its retracted position, each plate 22, specifically its bottom side, rests on the heads of the different needles 11 which thus remain immobilized. By means of the explained arrangement, the head 10 will be able to carry two or four parallel rows of injecting needles 11 with a great easiness for their reposition.

In FIG. 3, each needle 11 has in its top portion for assembly on the plate 12, two thickenings 11' and 11", which carry coaxially housed the respective tightening gaskets 19, O-ring type, which are defined in the needle 11. Each needle has one orifice 20, for access to the bore of this needle 11 through the chambers comprising the manifold 18. The mouthpiece of the mentioned ducts 14, are sealed by means of threaded tightening bushings 21.

Briefly with reference to FIGS. 5a, 5b and 5c, one sees that the transport floor is formed by a conventional grate of equidistant and parallel roller bars, upon which a number of rectilinear grids 31 have been arranged making up an interlocked ensemble, which in coordination with the up-and-down movement of the head 10, executes a progressive raising and transverse periodic movement. According to the preferred system, the top profile of each one of those grids is tooth-shaped (blunt) where the teeth 21 have the configuration of a flat-topped pyramid or frustum, which efficiently ensures the fixation of the meat piece 33, preventing the inertial movements of the meat piece when the operative cycle of the machine is performed at high speed.

With reference to both FIGS. 3 and 5a, it can be seen that the ducts that pass through each pressing block 17, have two portions clearly differentiated: The first one 34, very long, fairly exceeds in diameter the regular section of the needle 11, while the second duct section 34', very short, allows the close-fitting passage of the needles 11. In this way, each duct contains an annular chamber or cavity 35, which tends to get filled with the substance 36 injected under pressure through the small diameter orifices 11' of needles 11. The sharp impact of this substance 36 during its injection is avoided by reducing its speed (flow) and pressure when the cavity overflows with brine or other substance 36. Any suitable overflow fluid detection means 37 may be employed to trigger the appropriate pressure/flow controller 38. Foaming of the injection substance 36 can never be generated as a consequence of the diameter of the aforementioned orifices 11' and the pressure values of the injected fluid.

On the other hand, when the pressurized injection is interrupted, the fluid which percolates through the needles 11, coming under gravity from the chamber 30 and from the reservoir 28, as above explained, guarantees that the cavity 35 will be, at all times, full of injection substance 36.

Figure 4:
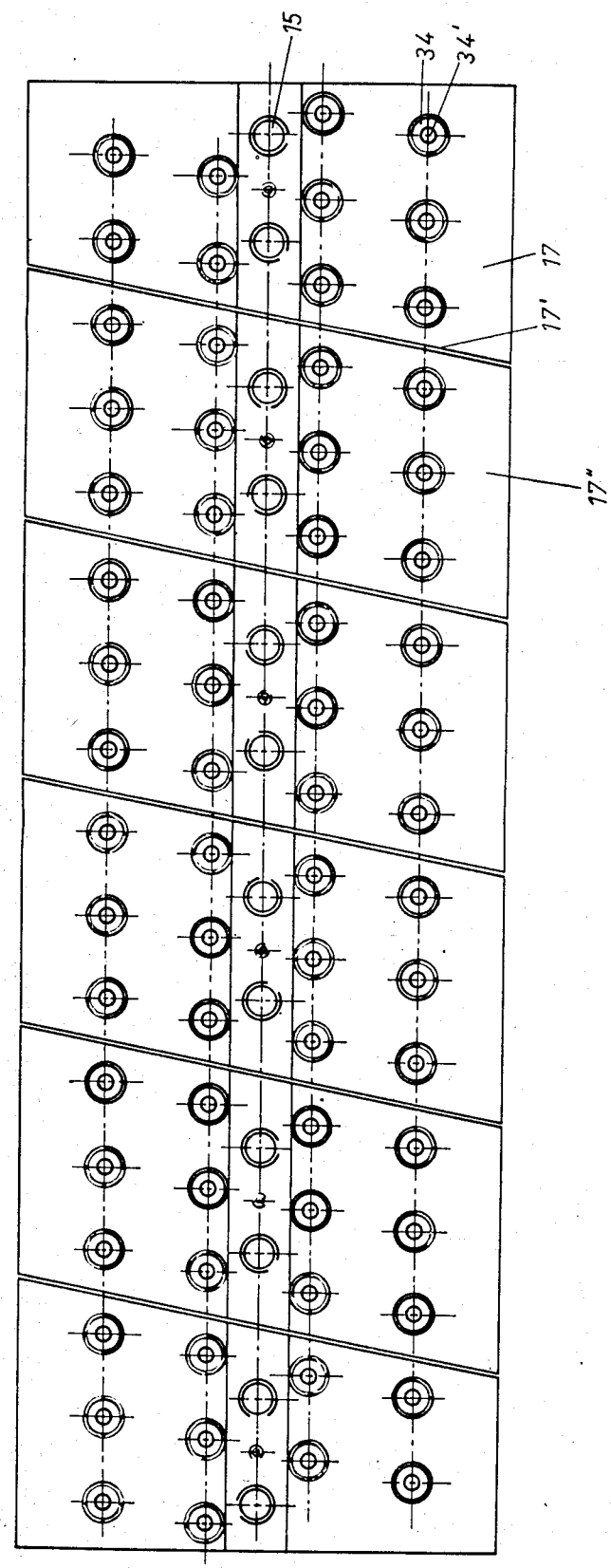
FIG. 4 shows the assembly of the pressing blocks (bottom view)

Finally, in reference to FIG. 4 it can be seen the form that the flat rectilinear blocks 17 adopt in their role as meat-piece pressers. These blocks 17 are framed by a number of oblique walls 17' in order to make possible the passage of the four rows of parallel quincunxarranged needles 11. Thus, the four central blocks 17 are equivalent and rhomboidal while the end blocks 17 are trapezoidal.

Having described with sufficient detail the embodiments to which this invention relates, in such a way that they may be intelligible for one of ordinary skill in these matters, it will be understood that the present invention is not limited thereto, but may be otherwise embodied within the scope of the following claims.

I claim:

1. An improved apparatus for injecting pressurized fluid into conveyored meat pieces, comprising:
    a relatively fixed base plate;
    a movable head assembly;
    a plurality of multi-orificed needles which are mounted in said movable head assembly;
    a plurality of transverse pressing blocks disposed between the meat piece and said relatively fixed base plate of said movable head assembly;
    a series of vertical cylindrical ducts disposed in parallel rows along a length of said pressing blocks so as to permit the passage of said needles therethrough, and which are arranged such that said parallel rows of ducts are mutually offset in a quincunx-like pattern of ultimate injection holes in the meat piece;
    a dual diameter configuration for each of said vertical cylindrical ducts wherein an upper section of each said duct is somewhat larger than a respective diameter of a corresponding one of said needles, and a lower section of each one of said ducts is nearly equal to said diameter so that each said duct serves as a guide formed by said corresponding one of said needles and said upper section; said chamber tending always to be filled with fluid which has been fed to the needle by fluid pressure during injection, and under the influence of gravity before and after injection; and
    a means for reducing flow and pressure of an injection fluid when each said upper fluid chamber of said ducts overflow an entire set of pressing blocks and fall onto a meat conveyor floor, whereby said fluid can be recycled to said head assembly without introduction of air or foam.

2. The improved injection apparatus of claim 1, wherein each said injection needle has an upper butt; each said movable plate having a set of elongated slot holes and a corresponding set of vertical stems fixed to said fixed base plate;

said fixed base plate includes two movable transverse plates which are mutually parallel and contain rows of holes which run the full length of said head assembly such that either plate can be moved over said upper butts of said injection needles in laterial sliding limited by said set of elongated slot holes which cooperate with said corresponding set of vertical stems whereby needle insertion and replacement is facilitated by virtue of the achievable hole-for-needle quincunx-linke correspondence between the patterns of holes, ducts, and needles.

3. The improved injection apparatus of claim 2 wherein said fixed base plate contains a centralized longitudinal row of blind holes for accommodating a corresponding row of vertical guiding bars which are mounted to said base plate to permit alignment of the pressing blocks.

4. The improved injection apparatus of claim 1 wherein said vertically movable head assembly is fed pressurized fluid through an inlet at an upper end of an "inverted-V-shaped" pipe which is fixed to said head assembly at two lower ends thereof where said pipe is joined to an internal fluid manifold of said base plate in such a way that, between injection phases, the unpressurized fluid in an upper part of the pipe is permitted to drain down slowly through said manifold and ultimately out said injection orifices of said needles thus ensuring that air cannot enter said needles before a next injection phase begins.

5. The improved injection apparatus of claim 1 whose meat-piece conveyor system includes the following:
   (a) a conveyor floor made up of a set of interlocking rectilinear grids which ride over a number of parallel roller bars, and
   (b) a number of upward-protruding blunt teeth fixed to each of said rectilinear grids where the shape of said teeth is frustum-like.

* * * * *